(12) United States Patent
Andreasen et al.

(10) Patent No.: US 8,042,148 B2
(45) Date of Patent: Oct. 18, 2011

(54) SYSTEM AND METHOD FOR ENFORCING POLICY IN A COMMUNICATION NETWORK

(75) Inventors: Flemming Stig Andreasen, Marlboro, NJ (US); Jonathan D. Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 1173 days.

(21) Appl. No.: 11/671,861

(22) Filed: Feb. 6, 2007

(65) Prior Publication Data
US 2007/0226775 A1    Sep. 27, 2007

Related U.S. Application Data

(60) Provisional application No. 60/771,513, filed on Feb. 7, 2006.

(51) Int. Cl.
*G06F 7/04* (2006.01)
(52) U.S. Cl. .............. 726/1; 726/14; 726/17; 713/172
(58) Field of Classification Search .................. None
See application file for complete search history.

(56) References Cited

U.S. PATENT DOCUMENTS

| | | | |
|---|---|---|---|
| 6,876,668 B1 * | 4/2005 | Chawla et al. | 370/468 |
| 6,920,499 B2 * | 7/2005 | Chen | 709/227 |
| 7,013,338 B1 * | 3/2006 | Nag et al. | 709/226 |
| 7,123,598 B1 * | 10/2006 | Chaskar | 370/331 |
| 2002/0062379 A1 | 5/2002 | Widegren et al. | 709/227 |
| 2004/0073928 A1 | 4/2004 | Alakoski et al. | 725/62 |
| 2005/0041584 A1 | 2/2005 | Lau et al. | 370/235 |
| 2005/0278447 A1 | 12/2005 | Raether et al. | 709/227 |

OTHER PUBLICATIONS

Notification of Transmittal of the International Search Report and the Written Opinion of the International Searching Authority, or the Declaration, International Application No. PCT/US07/03403, 12 pages.
State Intellectual Property Office of the People's Republic of China, The First Office Action and Text of the First Office Action, Application No. 200780004639.5, dated Dec. 1, 2010, forwarded by foreign associate to Baker Botts on Mar. 3, 2011; 7 pages.

* cited by examiner

*Primary Examiner* — Kaveh Abrishamkar
(74) *Attorney, Agent, or Firm* — Baker Botts L.L.P.

(57) ABSTRACT

A system for enforcing policy in a communication network includes a policy server which is operable to receive a request to invoke an application, receive a policy profile for a network user, and decide a proper allocation of network users based on the policy profile, the application, and available network resources. The policy server is further operable to communicate with a non-SIP application. The system also includes a network resource manager operably associated with the policy server and operable to monitor available network in the resources in the communication network. In addition, the network resource manager is functional to allocate network resource amongst a plurality of network users. The system also contains an application control point which is operably associated with the policy server and operable to communicate with a SIP application. The system is operable to use policy peering between the home and visited network to enable user-specific policies to be enforced while roaming.

32 Claims, 3 Drawing Sheets

SYSTEM AND METHOD FOR ENFORCING POLICY IN A COMMUNICATION NETWORK

RELATED APPLICATIONS

This application claims the benefit of U.S. Provisional Application No. 60/771,513 filed Feb. 7, 2006.

TECHNICAL FIELD OF THE INVENTION

This invention relates in general to communication systems and more particularly to a system and method for enforcing policy in a communication network.

BACKGROUND OF THE INVENTION

As communication services and products continue to grow and expand, so does the need to enforce policy within a communication network. While applications such as push-to-talk, video-telephony, and enterprise video conferencing have enhanced communications, they necessitate a broader range of policy enforcement capabilities. In particular, because such applications may operate using Session Initiation Protocol (SIP), they require unique interfaces between network devices to enforce policy. Further complicating policy enforcement is the need to provide user-specific policies since every subscriber is not the same and some will pay more for their services than others. Enforcing a user-specific policy in a modern communications environment wherein a user may roam between networks hosted by different providers also presents a predicament as the user's policy profile is typically only stored by the home service provider.

The IP Multimedia Subsystem (IMS) is a next generation networking architecture that allows service providers to provide both mobile and fixed multimedia services. Because IMS runs over the Internet protocol (IP) it allows a service provider to provide any service which the Internet can or will support. While the IMS architecture has numerous benefits, it currently only supports SIP enabled devices. Accordingly, it is not able to provide roaming policy support for many legacy devices and applications that do not use SIP. Further, the range of policy control which the system provides is limited to Quality of Service (QoS) and accounting. Given the breadth of features and the range of network resources necessary to support such features, it is desirable to enable a broader range of policy control.

SUMMARY OF THE INVENTION

In accordance with the present invention, a system and method for enforcing policy in a communication network is provided which substantially eliminates or reduces the disadvantages and problems associated with previous systems and methods.

In accordance with a particular embodiment of the present invention, a system for enforcing policy in a communication network includes a policy server which is operable to receive both an authorization request to allow an application invocation and a policy profile for a network user, and then decide a proper allocation of network resources based on the policy profile, the application, and available network resources. Network resources is here extended to not only include the traditional Quality of Service and associated accounting, but to also include network services such as security services, mobility services, relay services, transcoding functions, packet replication services, and deep packet inspection services. The policy server is further operable to communicate with a non-SIP application. The system also includes a network resource manager associated with the policy server and operable to monitor available network resources in the communication network. In addition, the network resource manager is functional to allocate network resources amongst a plurality of network users. The system also contains an application control point which is associated with the policy server and operable to communicate with a SIP application.

In more particular embodiments, the policy server may also decide whether an application may be invoked based on the application, a policy profile, and available network resources and communicate the decision to the application control point. In another embodiment, the authorization request comprises at least one token representing the application, and zero or more tokens representing altered application behavior, e.g. lowered bit-rate for a video stream. In yet another embodiment, the application control point is operable to invoke a different application based on the allocation of available network resources, or to alter the application behavior based on the allocation of available network resources.

In accordance with another embodiment of the present invention, a method for enforcing policy in a communication network includes sending a request to invoke an application from an access terminal, and sending a policy authorization request for the application invocation to a policy server in response to receiving the request to invoke. In this embodiment, the authorization contains a set of tokens representing the application and its associated parameters, e.g. media streams with associated media types, codecs and bandwidth requirements. The method also includes obtaining a policy profile and information regarding available network resources from a network resource manager. The method further includes allocating available network resources based on the policy profile, the application tokens, and the available network resources. The method also includes the policy server possibly modifying the application invocation by passing a set of tokens back to the requesting application.

Technical advantages of particular embodiments of the present invention include enabling policy enforcement for SIP and non-SIP applications and devices in both visited and home networks. Another technical advantage is that the policy server is functional to enforce policy over a multitude of network resources, not simply QoS and accounting. A further advantage is that applications and their associated parameters may be represented by tokens which allows for applications to be added, modified and controlled without changing the software in deployed components. Also, the policy server may influence the application behavior by sending tokens to the application.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

To provide a more complete understanding of the present invention and the features and advantages thereof, reference is made to the following description, taken in conjunction with the accompanying drawings, in which like reference numerals indicate like features and wherein.

DETAILED DESCRIPTION OF THE INVENTION

Figure 1:
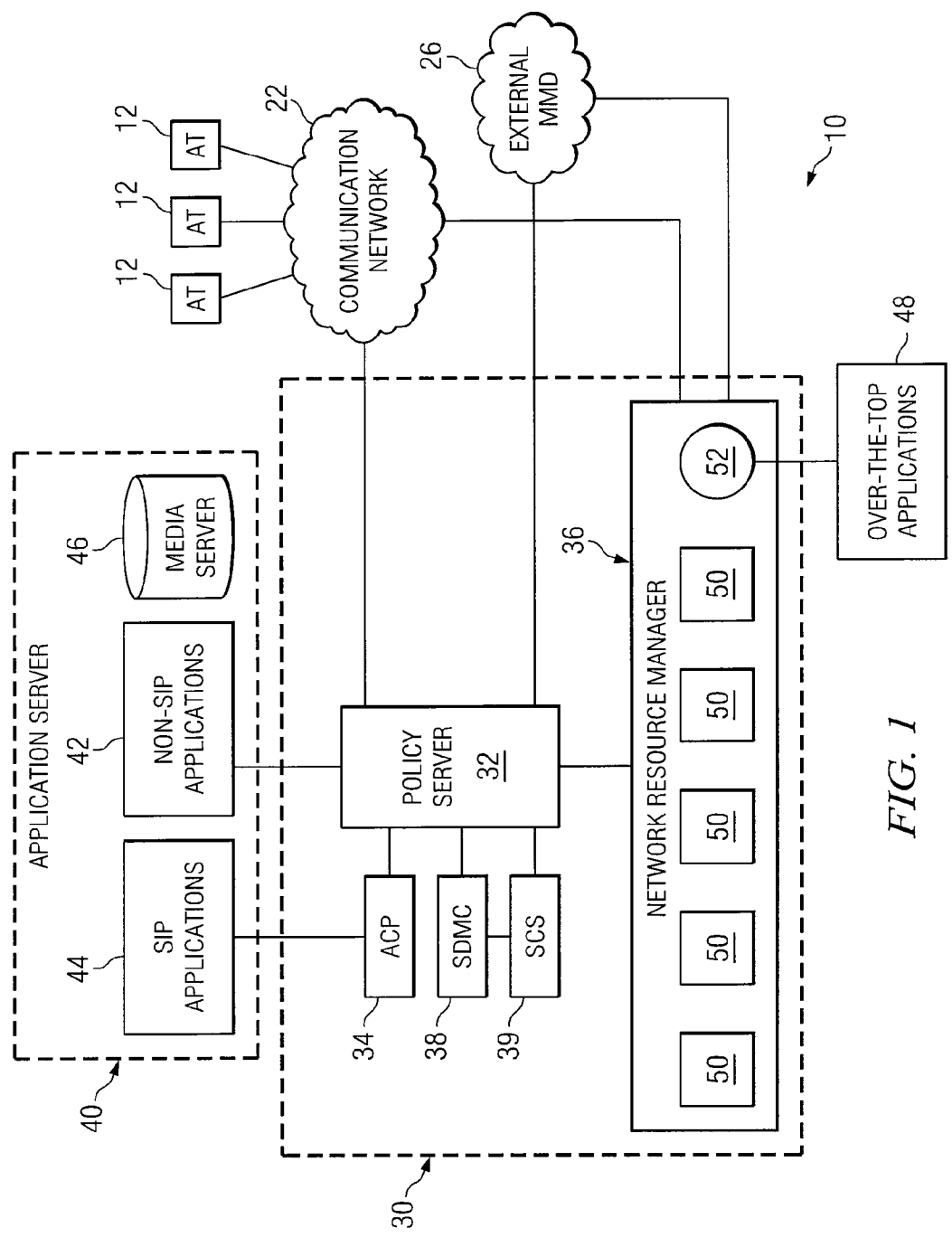
FIG. 1 is a simplified block diagram that illustrates a communication system for enforcing policy in a communication network.

FIG. 1 illustrates a communication system 10 for communicating, receiving, and/or transmitting data in accordance with an embodiment of the present invention. Communication system 10 includes a plurality of access terminals 12, communication network 22, and external multimedia domain (MMD) 26. Communication system 10 further includes policy center 30 which comprises policy server 32, application control point 34, network resource manager 36, Services Data Management Center (SDMC) 38, and Security Center Server (SCS) 39. Also included in communication system 10 is application server 40 which may include Session Initiation Protocol (SIP) applications 42 and non-SIP applications 44.

In accordance with the teachings of the present invention, policy center 30 is functional to apply subscriber specific system policies across communication system 10. In another embodiment of the present invention, policy center 30 is further capable of applying generic network policy throughout communication system 10. Further, policy center 30 may also apply such policies to both SIP and non-SIP based applications as well as roaming and non-roaming subscribers.

As illustrated in FIG. 1, communication network 22 represents a series of points or nodes of interconnected communication paths for receiving and transmitting information or data throughout communication system 10. While illustrated as a single network, communication network 22 is intended to represent any number, type, size, or group of communication networks. More particularly, communication network 22 represents any network, or group of networks, capable of transmitting audio, and/or video telecommunication signals, data, and/or messages, including signals, data, or messages transmitted through text chat, instant messaging, and e-mail. In particular, a communication network may comprise all or a portion of a radio access network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Communication network 22 may contain or interface with any combination of hardware and/or software to provide its intended communication capabilities. For example, communication network 22 may contain any number or combination of communication platforms, routers, servers, gateways, switches, hubs, and/or conference bridges. In certain embodiments, communication network 22 may also contain any number of application specific integrated circuits (ASIC), processors, microprocessors, algorithms, read-only memory (ROM) elements, random access memory (RAM) elements, erasable programmable ROM (EPROM), electrically erasable programmable ROM (EEPROM), field-programmable gate array (FPGA), or any other suitable element or object that is operable to facilitate the operations thereof.

In particular embodiments of the present invention, communication network 22 implements a TCP/IP communication protocol. However, communication network 22 may implement any other suitable communication protocol for transmitting and receiving data packets within communication system 10. Using Internet Protocol (IP), each of the components coupled together by communication network 22 in communication system 10 may be identified in information directed using IP addresses. In this manner, communication network may support any form and/or combination of point-to-point, multicast, unicast or other techniques for exchanging media packets or information among components in communication system 10. In another embodiment of the present invention, communication network 22 may receive and transmit data in a Session Initiation Protocol (SIP) environment. SIP is an application-layer control protocol that includes primitives for establishing, modifying, and terminating communication sessions. SIP works independently of underlying transport protocols and without dependency on the type of session that is being established. In further embodiments, components of communication network 22 may use various other protocols and technologies, including but not limited to global system for mobile communications (GSM), code division multiple access (CDMA), and any other appropriate analog or digital wireless protocol or technology.

External MMD 26 represents a communications network controlled by a different service provider than the rest of communication system 10. Accordingly, external MMD 26 may represent a roaming or visited network. In one embodiment of the present invention, external MMD 26 is a network containing the policy center 30 architecture of communication system 10. External MMD 26 may also be an IP Multimedia Subsystem (IMS) network or any other combination of devices for transmitting and receiving data and information. Further, external MMD 26 may be equipped with any combination of devices or features provided for in communication network 22.

Access terminals 12 are the objects upon which user-specific system policy is enforced. Access terminals 12 may encompass a myriad of potential devices and infrastructure that may benefit from the operation of communication system 10. For example, an access terminal may include a Personal Digital Assistant (PDA), a cellular telephone, a standard telephone, an IP telephone, a personal computer, a mobile telephone, or any other suitable device that is operable to receive or transmit data. Each access terminal may also include suitable network equipment and appropriate infrastructure such as switches, routers, LANs, or gateways to facilitate a communication session within communication system 10. Further, in particular embodiments, access terminals 12 may be SIP compatible elements.

Access terminals 12 may connect to a communication network in numerous ways. For instance, a connection might be made through a fixed broadband connection such as a digital subscriber line (DSL), cable modem, or Ethernet. Wireless access to communication network 22 may be initiated through a WLAN, WiMAX, or WiFi access point. Further, mobile access may be permitted via CDMA, CDMA 2000, GSM, UMTS, or any other mobile standard. Although FIG. 1 illustrates a particular number and configuration of access terminals 12, communication system 10 contemplates any number or arrangement of such components.

Application server 40 hosts and executes applications. The term application refers generally to any services that a subscriber might see and use. In particular, applications may include push to talk over cellular (PoC), basic voice service, video-telephony, streaming movies, enterprise voice conferencing, voicemail and so on. In certain embodiments, the applications are SIP applications 44 and/or non-SIP applications 44. In addition to applications, application server 40 may also include a media server 46 for transmitting various video, audio, and other data.

Policy center 30 implements and deploys policies throughout communication system 10. While the illustrated embodiment indicates that policy center 30 comprises policy server 32, ACP 34, network resource manager 36, SDMC 38, and security center 39, policy center 30 may include any combination of elements operable to enforce policy in a communications network. Further, one skilled in the art will readily recognize that the components of policy center 30 may be combined in any suitable manner without departing from the scope of the present invention.

Policies might include which applications a user may run, when an application may be run, how network resources are allocated to an application or user, and any other decision that affects network resources or user interaction within a communication network. Moreover, a policy might be user-specific or generic to all users of communication system 10. For example, a user-specific policy might provide that a particular user may use certain applications. By contrast, a generic policy might require that a certain percentage of network bandwidth be allocated to streaming media. Enforcing both generic and user-specific policies enables a service provider to efficiently allocate resources within a communication network while simultaneously providing for the unique needs of an individual user.

In an embodiment of the present invention, policy center 30 allocates network resources by application, and possibly associated application parameters, as opposed to application independent criteria such as bandwidth. This is done for all kinds of applications, both SIP and non-SIP based. Because users often purchase applications (as opposed to simply bandwidth), a subscriber does not care how much bandwidth an application requires, rather that the application is functional. Therefore, allocating network resources according to applications may allow a service provider to better serve its users.

Policy center 30 is also functional to dynamically adjust policy decisions based on changes to network properties. Because network resources constantly fluctuate, it is desirable to provide flexible policy enforcement. For example, if a user enters a poor coverage area while simultaneously running a video-telephony session and a multimedia game, policy center 30 might provide the user with a pop-up message informing the user that one of the two applications has been disabled. Alternatively, the message may query the user to elect which of the two applications to disable.

Another feature of policy center 30 is that it may provide user-specific policy for all applications and all users. Accordingly, unlike a P-CSCF and its associated Policy and Charging Rules Function (PCRF) in an IMS network, policy center 30 may assert policies for non-SIP applications. Further, by peering policy servers in various networks, a policy center in a visited network can assert user-specific policies from the home network of a roaming user, irrespective of whether the application uses SIP or not.

A further feature of policy center 30 is that it may implement an enhanced range of policies. While policy enforcement in networks such as the IP Multimedia Subsystem (IMS) is typically limited to accounting and QoS, policy center is operable to enforce policy for security, mobility, relay, transcoding, packet replication, and deep packet inspection. The broader range of policy enforcement gives a service provider greater control over its network, while enhancing user customization.

In the illustrated embodiment, the components of policy center 30 may communicate amongst each other via DIAMETER interfaces. Uniform communication interfaces promotes interoperability and enables policy enforcement to be applied to applications invoked by different protocols. The DIAMETER protocol is a derivation from the Remote Authentication Dial In User Service (RADIUS) protocol which enables user Authentication, Authorization, and Accounting (AAA) services. Because authentication and authorization mechanisms vary according to application, DIAMETER applications are able to define their own messages and corresponding attributes. Accordingly, the DIAMETER protocol is not tied to a specific application running on top of it. Therefore, the DIAMETER protocol enables policy center 30 to implement network and user-specific policy for both SIP and non-SIP applications.

Services Data Management Center SDMC 38 is the central data repository in communication system 10. SDMC 38 may store access terminal specific data in addition to user specific data. Access terminal specific data may include the access terminal profile and network policy data which is not specific to any user. User specific data may include user policy data, user profile data (i.e. a user policy profile), and static user data. Static user data comprises information that is necessary to be retained by service enablers and the application server for deploying applications. In particular, static user data might include feature activation status, buddy lists, or authorization rules. SDMC 38 may also store SIP routing information, charging information, and any other repository data that may need to be stored and retrieved in the communications network. As illustrated in FIG. 1, SDMC 38 interfaces with policy server 32. This allows SDMC to pass updated policy profiles and other information so that current policy may be enforced.

Security Center Server (SCS) 39 handles security related functions for the service provider within communication system 10. SCS may hold Layer 2, Layer 3, and application layer authentication and encryption keys. SCS may also store all inter-network element encryption and authentication keys. Further, SCS is functional to provide AAA services and information for devices and users within a communication system. In particular embodiments, SCS 39 may interface with policy server 32 and SDMC 38 to provide policy server 32 with a combined security and quality of service (QoS) application policy.

Application Control Point 34 controls and manages SIP based multimedia communications applications. More particularly, ACP is responsible for authorizing SIP calls to and from access terminals and routing those calls to the proper terminating device whether it is another ACP, a gateway to a PSTN, or an external MMD. Accordingly, ACP is similar to the Call Session Control Function (CSCF) in an IMS communications network.

In operation, ACP 34 interacts with SIP applications 44 and policy server 32 to enforce policies at the applications layer. Because SIP applications 44 do not directly interact with policy server 32, ACP 34 requests authorization for invoking SIP applications from policy server 32 which in turn makes a determination of what resources the application is authorized to use. Based on this determination, the ACP provides SIP applications 44 with one or more service enablers to deploy the application. A service enabler might include user identity, registration, privacy, user security, presence, and location among others. Associated with each service enabler is a policy hook which controls the operation of the application. Thus, ACP 34 is the policy enforcement point (PEP) at the applications layer for SIP based applications.

Network resource manager 36 is responsible for policy enforcement at the bearer or network level. Network level policy enforcement addresses how network resources 50 are allocated to users within the network. In particular, network policies may include filtering packets, setting counters, providing Quality of Service (QoS) and radio resources, and allocating bandwidth, among others, or any other decision regarding the distribution of network resources.

Network resources 50 may include accounting, QoS, mobility, security, relay, transcoding, packet replication, and deep packet inspection. Accounting resources comprise packet counters and filters throughout the network which may be configured to generate records to SDMC 38 for billing purposes. The counters may also be configured with triggers to inform policy server 32 of specified occurrences. QoS refers to allocating bandwidth to control data flow in the network. Mobility relates to information regarding a user's communication session. In particular, such information may include duration of a network connection, the access network to which a user is connected, the user's signal strength, and the identity of the visited network (when roaming). Security relates to the identity of a network user, user authentication, and the relationship between user identity and operator policies. Relay references the allocation of network resource when a user connects to a home network provider through an intermediary provider. Transcoding refers to changing the encoding of media from one format to another. Packet replication refers to generating copies of packets (e.g. streams). Deep packet inspection refers to classifying network traffic based on application layer information deep within a packet.

Network resource manager 36 also controls "over-the-top" applications 48. Over-the-top applications are applications which have application servers that run outside of the service provider's network, but utilize network resources. One type of over-the-top applications are applications controlled by providers without a relationship to the home service provider. Such applications are referred to as "non-cooperative" over-the-top applications. Examples of such might include Skype or third-party instant messaging programs such as AIM or Yahoo. Other over-top-applications include applications in a home network invoked by a roaming user. If there is a business agreement between the home network service provider and the roaming network service provider, then such applications are referred to as "cooperative" over-the-top applications.

Because application servers for over-the-top applications do not have direct interaction with the policy server in the accessed network, such applications are supported via deep packet inspection at deep packet inspector 52. Deep packet inspection services may operate at various points in the network and function to classify network traffic according to application layer information deep within the packet.

Based on certain characteristics in the network traffic associated with the over-the-top application, the policy server for the hosting network may implement certain policies. In particular, if the over-the-top application is cooperative, then the policy server might request the network resource manager to allocate a certain bandwidth based on the business relationship between the service providers. By contrast, if the application is a non-cooperative over-the-top application, the policy server might request the network resource manager to provide reduced, or even no, bandwidth at all for the application session. It should be noted that while the deep packet inspector is illustrated as a component of network resource manager 36, deep packet inspector may be located anywhere in a communication network where it may provide its intended functions.

As represented in FIG. 1, policy server 32 is the policy decision point (PDP) in policy center 30. As the PDP, policy server 32 is operable to receive policy profiles and determine a proper allocation of network resources and how applications should behave in light of the allocation. In particular, policy server 32 receives a user-specific or generic network policy profile from an internal memory cache or SDMC and splits policy decisions into the appropriate parts for ACP 34 and network resource manager 36 for application level and network level enforcement.

Figure 2:
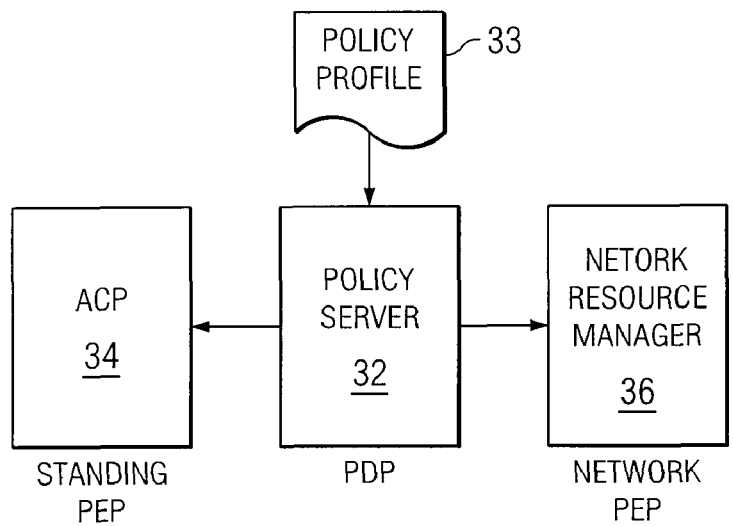
FIG. 2 is a simplified block diagram that illustrates a split policy enforcement model of the communication system.

FIG. 2 illustrates the split policy enforcement model implemented through policy server 32 in accordance with an embodiment of the present invention. Because policy enforcement involves two sets of decisions the allocation of network resources to the application and application behavior in view of the allocated resources it may be advantageous to split policy enforcement between signaling and network layers.

As illustrated in FIG. 2, policy server 32 receives a policy profile 33 and outputs a decision as to how an application may use available network resources. The decision is enforced in different places. Network resource manager 36 is the network layer policy enforcement point (PEP) and ACP is the PEP at the signaling layer. Accordingly, network resource manager might perform such tasks as filtering packets, setting counters, and providing QoS, whereas ACP might change which SIP applications are invoked or terminate a call.

A split policy enforcement model offers several advantages. For example, having a single policy decision point allows for unified management of applications and network resources. This ensures that invoked applications have sufficient resources and that applications are not deployed without sufficient resources. Further, a split enforcement model enables policy peering wherein a home network may assert its policies when a user enters a roaming network, irrespective of whether the roamed-to network supports the application in question or not. Another benefit of the bifurcated approach is that policy may be enforced for both SIP and non-SIP applications. Specifically, ACP 34 is functional to interface with SIP applications and policy server 32 can invoke non-SIP applications either directly or by communicating with an application server 40.

Returning again to FIG. 1, in an embodiment of the present invention, policy server 32 is linked to non-SIP applications 42 over a DIAMETER interface. Non-SIP applications 42 comprise network applications supported by the home service provider which are not invoked using SIP protocol. Such applications may include gaming and streaming media. Unlike SIP applications 44, for which ACP 34 is the application layer PEP, the PEP for non-SIP applications 42 is the non-SIP application itself. In either case however, the network level PEP is the network resource manager. Accordingly, policy center 30 is functional to apply network and user policies to both SIP and non-SIP applications.

Policy server 32 may also interface with network resource manager 36. This connection permits policy server 32 to implement an array of network policies by linking it with network resources 50. For instance, mobility resources may allow for a mobility policy which defines what access networks a user may roam between (WiFi, WiMAX, CDMA, etc.). Similarly, a security policy might restrict which applications or network resources a user might access. Further, the deep packet inspection resources could allow policy server to implement a policy regarding how the network should handle applications for which there is not an application function. In particular, the policy server could provide that such applications can only be invoked in certain areas of the network or that the application be allotted reduced bandwidth. The foregoing policies are provided as examples and should not restrict the scope of the invention as policy server 32 is operable to implement any number of policies regarding the allocation of network resources.

In a particular embodiment of the present invention, policy server 32 is operable to store a copy of an active user's current policies and resource allocation in an internal memory cache. This information may be used to decide current capabilities and location of a user within the network. Storing such information in an internal memory cache enhances efficiency as the policy server 32 does not need to query SDMC 38 for an updated policy-profile each time there is a change in available network resources or a user invokes an application.

Figure 3:
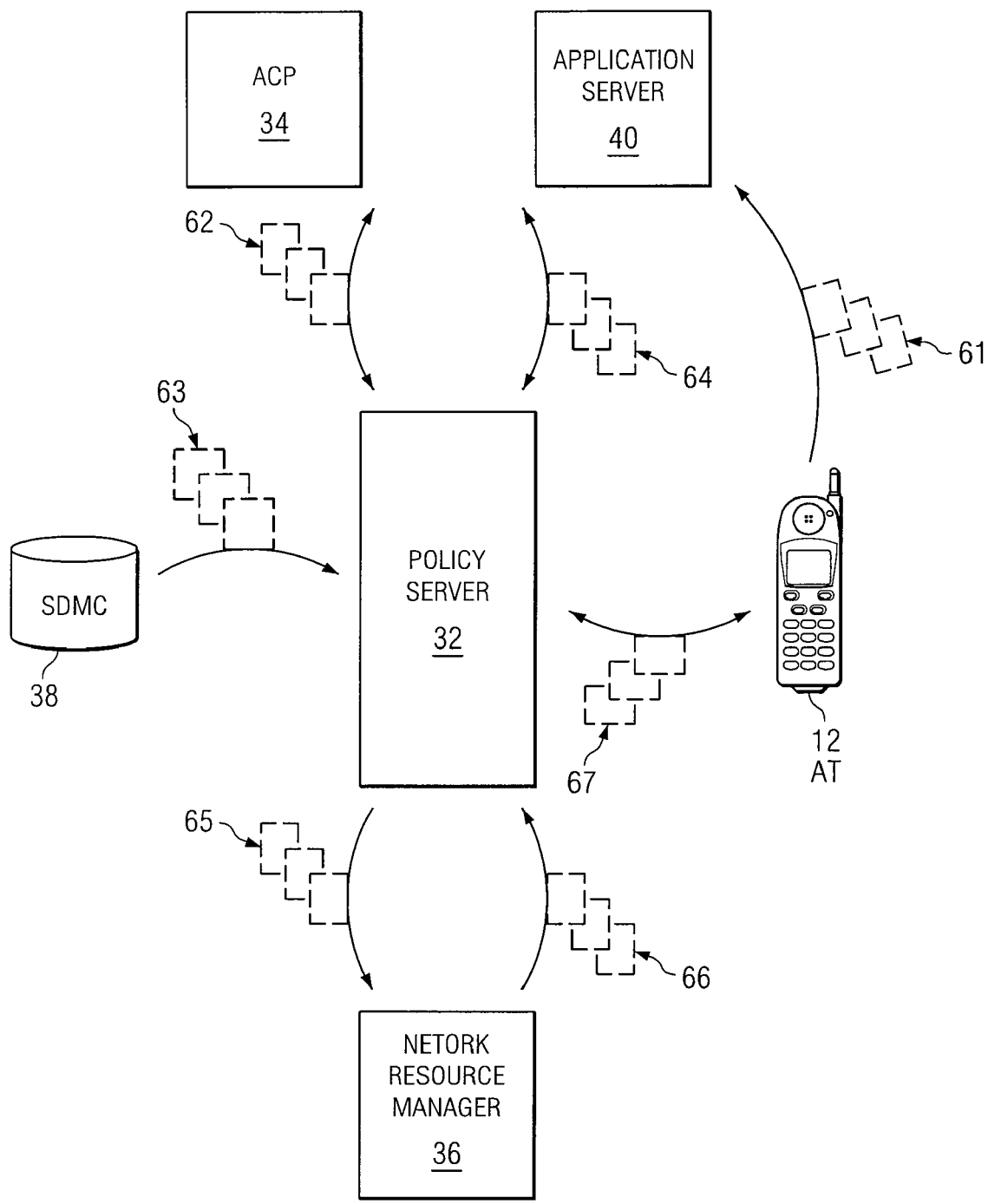
FIG. 3 is a simplified block diagram that illustrates the operation of the communication system.

FIG. 3 illustrates the operation of policy center 30 in accordance with one embodiment of the present invention. As discussed, policy enforcement addresses both the allocation of network resources to an application and how an application behaves in view of the allocated resources. Thus, policy control begins with the invocation of an application. An application is invoked by sending an invoke request 61 to the application server 40 and/or ACP 34. While an application is typically invoked from an access terminal 12 (as illustrated in FIG. 3), applications may also be invoked by the network on the user's behalf. For instance, the network might send the user an alert for a calendar appointment or a user might receive a communication session request from another user.

An invoked application may be an over-the top application, a SIP application, and/or a non-SIP application. The means for invoking the application is application dependent. As an example, in the case of an application related to presence, instant messaging, or multimedia communications, the invocation means is typically via SIP signaling. In particular, a video telephony application might be invoked with SIP INVITE messages and a presence subscription might be invoked by a SIP SUBSCRIBE message.

In response to receiving invoke request 61, application server 40 or ACP 34 will send an authorization request 62 to policy server 32. Authorization request 62 is a message seeking authorization to launch the invoked application with the parameters indicated. The request may contain information regarding the application that is being invoked, its associated parameters and the network resources the application will require. In addition, authorization request 62 may include the subscriber identity to allow policy server 32 to implement user-specific policies. It should be noted that, because ACP 34 serves as the PEP at the application signaling layer, if the invoked application is SIP based, then authorization request 62 is sent from the ACP.

In a particular embodiment of the present invention, authorization request 62 may be in the form of one or more virtual token. A token is a text stream characterizing an invoked application and/or its associated parameters. The characterization includes the requested media stream(s), but may also include other parameters relevant to support implementing policy while the application is deployed. In particular, the token may include characterizations such as 'voice', 'video', 'telephony', 'interactive', 'Push-to-talk', and 'gaming'.

In an embodiment of the present invention, the token is created using syntactic processing pattern matching techniques which analyze the contents of the application sought to be invoked. A pattern matching technique might involve using a rules engine which performs matching operations between a set of input data (e.g. a SIP message) and a set of matching criteria (e.g. a message filter criterion) and decides if a match exists. In response to a match, one or more tokens describing the application may be generated by either application server 40 or ACP 34. Once the rules engine has finished running through all of the applicable classification rules, the resulting tokens are passed to policy server 32 via authorization request 62. In addition to tokens, the message may contain information regarding the invoke message such as the IP address and ports for the media streams, the codecs, and the necessary bandwidth for the codecs.

Classifying applications as tokens offers several advantages. For instance, using a token to characterize an application allows for new applications to be added and controlled without requiring a software upgrade in the policy server. Specifically, because applications are represented as tokens, new ones can be added and policy can be implemented for them without requiring significant network modifications. A further advantage is that, because a software upgrade is unnecessary, deployment time for a new application is reduced.

Returning to FIG. 3, in response to receiving authorization request 62, policy server 32 will obtain the user specific and/or network policy profile. In an embodiment of the present invention, the profile may be stored locally in an internal memory cache within policy server 32 or in SDMC 38. Accordingly, policy server 32 will query its memory cache to determine whether the policy profile for the user is available. If the policy profile is not stored locally, policy server 32 will obtain the policy profile from SDMC 38 through policy message 63.

After obtaining the policy profile, policy server 32 makes a policy decision regarding the invoked application. This decision may be based on the contents of the token(s) in authorization request 62, the user's policy profile, the network's generic policy requirements, and/or the available network resources. The decision may be a "yes" or "no" answer. Alternatively, the decision may also be that the application may proceed, but with reduced or limited functionality. For example, a user might request to enter into a video-telephony session and given the user's policy profile and/or available network resources policy server 32 might determine that the user may proceed, but only with audio capabilities.

In an embodiment of the present invention, the policy profile is represented as a series of Boolean expressions. The expressions may be parsed by Policy server 32 through a series of pattern matching rules similar to the classification rules used in token creation. Based on the policy profile and the contents thereof, the policy server may add, drop, or substitute tokens from the set contained in authorization request 62. For example, if a user's policy profile restricts access in a particular network to audio streaming media and authorization request 62 contains a video token, then policy server 32 may drop the video token from the set of tokens contained in authorization request 62. Once policy server 32 has run through all of the Boolean expressions in the policy profile, the end product is a set of tokens defining the policy for the invoked application. This set of tokens is returned to application server 40 and/or ACP 34 via authorize message 64.

In response to receiving authorize message 64, applications server 40, or ACP 34 in the case of SIP based applications, may continue the applicable application invocation(s). For SIP applications, ACP 34 may deploy the application by providing it with a set of service enablers. In a particular embodiment of the present invention, ACP may implement its own policies that govern the way a service enabler functions. Such policies may be distinct from the policies of policy server 32 (to be discussed in greater detail below). For example, the policy server might tell ACP 34 that non-video applications of a certain bandwidth may be invoked. In response, ACP 34 may invoke appropriate applications. A benefit of this interdependency is that according to the available network resources and the user's policy profile totally different applications might be invoked. This offers a network service provider greater control over the subscriber's communication session and the applications that run on the network.

While an authorize message implements application side policy, instruct message 65 executes network level policy. In particular, instruct message 65 is a communication from policy server 32 to network resource manager 36 indicating how network resources should be allocated for a particular user. As an example, instruct message 65 might tell network resource manager 36 to increase bandwidth for the call or restrict access to certain networks. With respect to over-the-top applications, instruct message 65 might tell the network resource manager to look for certain types of traffic. In addition, the instruct message 65 might tell the network resource manager how to respond to a change in network condition in order to eliminate superfluous communication between the network resource manager and policy server. For example, the instruct message 65 might provide that if the subscriber is in a CDMA network, then a certain bandwidth should be allocated. However, if the subscriber enters an evolution data optimized (EVDO) network, extra bandwidth should be provided. This eliminates the process of the network resource manager communicating the change in networks to the policy server, the policy server making a policy decision, and communicating the decision back to the network resource manager.

Inform message 66 is an interaction between network resource manager 36 and policy server 32. An inform message 66 might be sent in two cases. First, when there is a change in a value of a variable corresponding to a network state that is relevant for policy server processing. Examples of this situation might include congestion in an access gateway, firing of a counter that was configured by the policy server, or a change in the point of attachment of a subscriber to the network. A second situation occurs when the user has requested an operation with respect to network resources for which authorization is required. For instance, when a user roams into a new coverage area, a decision must be made as to whether the communication session should be permitted to be handed off. In this situation, the user requests to engage in an activity which requires a reallocation of network resources and, thus, approval from the policy server is needed. In order to provide dynamic policy enforcement, the policy server is informed when either of the above-described situations occurs. Accordingly, inform message 66 is the means by which the policy server becomes apprised of a change in the status of a network resource and/or user request.

Tell message 67 is a communication between policy server 32 and access terminal 12. Tell message 67 might be sent by the policy server when it has made a decision regarding an application or its usage of network resources for which the access terminal needs to adjust its activities. For instance, a user might be running a non-SIP application and the policy server elects to eliminate the allocated bandwidth. In such a situation, the access terminal should be notified to provide the user with a prompt indicating the termination of the application. Tell message 67 might also be sent in situations where the policy server is either incapable or unable to make a firm decision regarding policy and requests user input to decide. Such a situation might arise when a user is running a high bandwidth game as well as a video-telephony session and the network must terminate one of the applications. Accordingly, the policy server may tell the access terminal to provide the user with a prompt soliciting the user to select which of the applications to shutdown. It should be noted that whether or not a policy server sends tell message 67 is a matter of policy.

In particular, a user's policy profile might provide that the user should be notified prior to having a communications session terminated.

Figure 4:
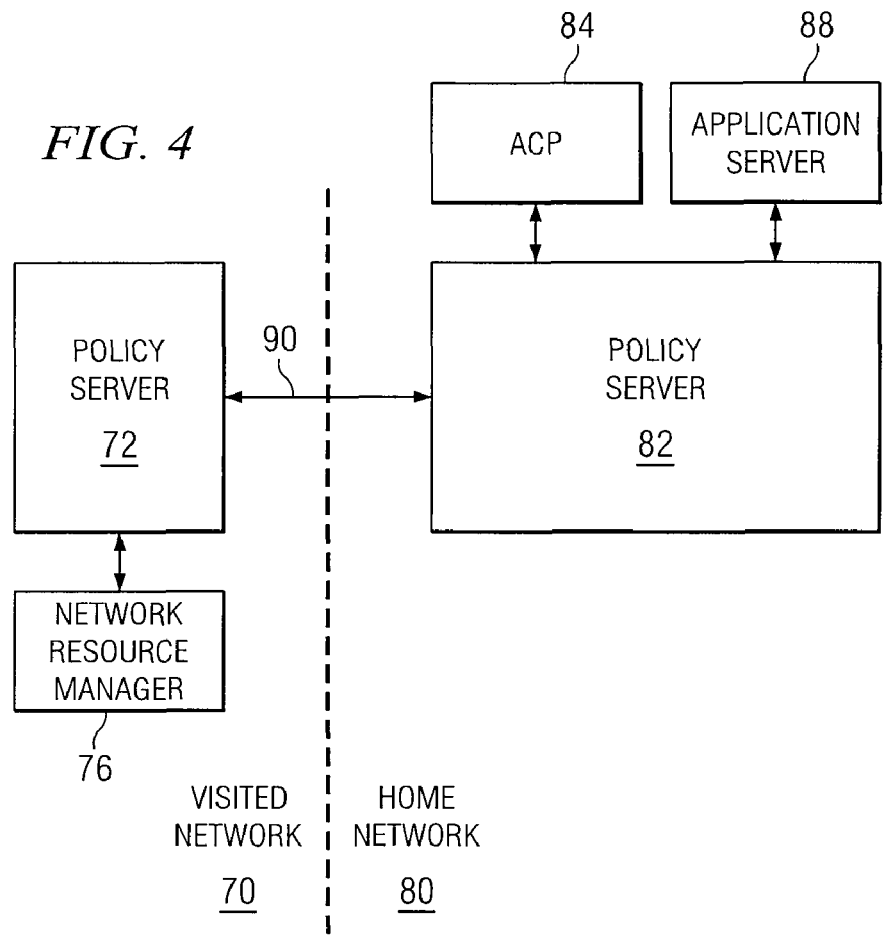
FIG. 4 is a simplified block diagram that illustrates policy peering in the communication system.

FIG. 4 is a simplified block diagram illustrating policy peering in accordance with an embodiment of the present invention. Policy peering refers to the ability of a home policy server and a policy server in a visited (e.g. roaming) network (or region) to each assert their own policies for a user. A principal objective of policy peering is to provide a seamless roaming experience for users so that a subscriber will experience substantially the same service in networks hosted by different providers, or different regions hosted by the same provider. Another objective of policy peering is to provide user-specific policy decision and enforcement while roaming. More specifically, when a user is in a roaming network, such as external MMD 26 in FIG. 1, the policy server in the visited network does not have access to the user-specific policy profile as it is stored in the home network. The roaming network provider typically only knows that a user from a certain home network has entered the provider's service area. Thus, the roaming network is not aware of the user's identity let alone the user-specific policy profile associated with the user.

In a particular embodiment of the present invention, policy peering is implemented by linking a policy server in the home network to a policy server in a visited network. A particular advantage of policy peering using policy servers is that it enables user-specific policy to be applied to non-SIP applications. Specifically, because policy server 32, as described above, is operable to implement policy for SIP and non-SIP applications, linking policy servers enables roaming policy enforcement regardless of the application. Furthermore, policy peering through policy servers also allows for user-specific policy to be implemented in a roaming network.

As illustrated in FIG. 4, policy server 72 and policy server 82 are linked by connection 90. Policy servers 72 and 82 are similar to previously referenced policy server 32. Policy server 72 is located in visited network 70 and policy server 82 is situated in home network 80. Connection 90 might be a wireless or wireline link or any other means of connecting devices in networks hosted by different providers. It should be noted that visited network 70 and home network 80 may include any other components, or combination devices, as may be required to facilitate inter-network and intra-network communications and implement policy. In particular, it is envisioned that both visited network 70 and home network 80 may each have policy centers 30.

When a user enters visited network 70 and executes an application, the application runs in home network 80 and is controlled by policy server 82. Policy server 82 implements its policies as usual. However, the policies are a function of network state variables in visited network 70. Network state variables are determined by policy server 72 based on the status of network resources provided by network resource manager 76, which is substantially similar to network resource manager 36. Network state variables provide a "view" of the underlying network that a roaming network provider sends to the home network provider. Network state variables are not necessarily the actual state of resources (i.e. network resources) in the visited network. By contrast, they comprise values of resources in roaming network 70 which the roaming network service provider wants the home network service provider to view. The view that is provided is a function of roaming network policy. This may be based on the identity of the home network provider, a business agreement between the home and roaming networks, and/or the actual state of the network itself. Because the identity of the subscriber is typically unknown, the view is generally not a function of subscriber identity. Further, because the applications the subscriber is running are known and controlled by the home network, the view is generally not a function of the active applications. Once policy server 72 determines the applicable network state variables, it communicates them to policy server 82 over link 90.

In response to receiving the network state variables, policy server 82 implements the policy of the home network. Policy enforcement at the applications level is similar to the standard home network policy enforcement previously described. In particular, policy server 82 may implement policy at the application level for SIP applications by communicating with application control point 84 and by directly communicating with application server 88 for non-SIP applications. It should be noted that ACP 84 is substantially similar to ACP 34 and application server 88 is substantially similar to application server 40.

The primary distinction between policy peering in a roaming situation and policy enforcement when a user is in a home network is with respect to network level policy enforcement. This is because the home network service provider does not have direct control over the resources in the roaming network. Therefore, instead of a network resource manager in home network 80 dictating how resources should be allocated, network resource manager 76 in the roaming network serves as the PEP for the roaming subscriber. Accordingly, home policy server 82 is viewed as an application by visited policy server 72. That is, home policy server 82 makes requests which call for network resources and the resources are allocated between it and other applications. Thus, both the visited and home network service providers are able to enforce their own policies.

Although the present invention has been described with particular embodiments, it should be understood that various other changes, substitutions, or modifications may be made hereto without departing from the spirit and scope of the present invention. For example, policy center 30 was described with reference to a number of components. These components may be combined, rearranged, or positioned in order to accommodate particular routing architectures or communication needs. In addition, the interfacing and communication among the components may be altered or varied without departing from the intended scope of the invention. Accordingly, the present invention contemplates great flexibility in the arrangement of the components of policy center 30 as well as their interactions.

Numerous other changes, substitutions, variations, alterations, and modifications may be ascertained by one skilled in the art and it is intended that the present invention encompass such changes, variations, alterations, and modifications as falling within the scope of the appended claims.

What is claimed is:

1. A system comprising:
one or more memories configured to store one or more policy profiles;
one or more processors configured to:
receive an authorization request to invoke an application for a user, the authorization request comprising a set of tokens characterizing the application, one or more tokens requesting one or more particular media streams;
obtain a policy profile;
make a policy decision according to the policy profile and the set of tokens;
add a token to, drop a token from, or substitute a token of the set of tokens based on the policy decision to yield a modified set of tokens; and
send an authorize message comprising the modified set of tokens to allow for invocation of the application according to the modified set of tokens.

2. The system of claim 1, the processors further operable to:
determine a proper allocation of one or more available network resources to provide for the application; and
communicate the proper allocation of the available network resources for the application.

3. The system of claim 1, the processors further operable to send the authorize message to an application control point to allow the application control point to enforce policy at a signaling layer.

4. The system of claim 1, the processors further operable to send an instruct message instructing how to respond to a change.

5. The system of claim 1, the processors operable to invoke a non-SIP application.

6. The system of claim 1, the processors operable to communicate the authorization message to a network resource manager to allow the network resource manager to enforce policy at a network layer.

7. The system of claim 1, the processors using DIAMETER protocol.

8. The system of claim 1, the processors further operable to:
determine a proper allocation of a plurality of available network resources to provide for the application, wherein the network resources comprise:
quality of service;
deep packet inspection;
accounting;
mobility;
security;
transcoding;
packet replication; and
relay.

9. The system of claim 1, further comprising a deep packet inspector, the deep packet inspector operable to classify traffic within a communication network.

10. The system of claim 9, wherein the deep packet inspector is operable to identify an application that operates on a server in a roaming network.

11. The system of claim 1, the processors operable to instruct an application control point to transmit one or more service enablers to one or more SIP applications, the service enablers containing a policy hook, the policy hook operable to control the operation of the application.

12. The system of claim 1, wherein the policy profile is a user-specific policy profile.

13. The system of claim 1, wherein the policy profile is a generic network policy profile.

14. The system of claim 1, the processors further operable to send a tell message to an access terminal, the tell message indicating a change in a proper allocation of one or more network resources.

15. The system of claim 1, the processors further operable to receive an inform message indicating a change in one or more available network resources.

16. The system of claim 1:
the receive the authorization request comprising receiving the authorization request at a policy server of a home network of the user; and
the send the authorize message comprising sending the authorize message to a network resource manager of a visited network of the user to allow the network resource manager to enforce policy in the visited network.

17. A method comprising:
receiving an authorization request to invoke an application for a user, the authorization request comprising a set of tokens characterizing the application, one or more tokens requesting one or more particular media streams;
obtaining a policy profile;
making a policy decision according to the policy profile and the set of tokens;
adding a token to, dropping a token from, or substituting a token of the set of tokens based on the policy decision to yield a modified set of tokens; and
sending an authorize message comprising the modified set of tokens to allow for invocation of the application according to the modified set of tokens.

18. The method of claim 17:
the receive the authorization request comprising receiving the authorization request at a policy server of a home network of the user; and
the send the authorize message comprising sending the authorize message to a network resource manager of a visited network of the user to allow the network resource manager to enforce policy in the visited network.

19. The method of claim 17, further comprising:
determining a proper allocation of one or more available network resources to provide for the application; and
communicating the proper allocation of the available network resources for the application.

20. The method of claim 17, further comprising:
sending the authorize message to an application control point to allow the application control point to enforce policy at a signaling layer.

21. The method of claim 17, further comprising:
sending an instruct message instructing how to respond to a change.

22. The method of claim 17, further comprising:
invoking a non-SIP application.

23. The method of claim 17, further comprising:
communicating the authorization message to a network resource manager to allow the network resource manager to enforce policy at a network layer.

24. The method of claim 17, further comprising:
using DIAMETER protocol.

25. The method of claim 17, further comprising:
determining a proper allocation of a plurality of available network resources to provide for the application, wherein the network resources comprise:
quality of service;
deep packet inspection;
accounting;
mobility;
security;
transcoding;
packet replication; and
relay.

26. The method of claim 17, further comprising:
classifying traffic within a communication network.

27. The method of claim 17, further comprising:
identifying an application that operates on a server in a roaming network.

28. The method of claim 17, further comprising:
instructing an application control point to transmit one or more service enablers to one or more SIP applications, the service enablers containing a policy hook, the policy hook operable to control the operation of the application.

29. The method of claim 17, wherein the policy profile is a user-specific policy profile.

30. The method of claim 17, wherein the policy profile is a generic network policy profile.

31. The method of claim 17, further comprising:
sending a tell message to an access terminal, the tell message indicating a change in a proper allocation of one or more network resources.

32. The method of claim 17, further comprising:
receiving an inform message indicating a change in one or more available network resources.

* * * * *